UNITED STATES PATENT OFFICE.

JAMES MILLAR NEIL, OF TORONTO, ONTARIO, CANADA, ASSIGNOR TO ALEXANDER M. HAY, OF TORONTO, CANADA.

PROCESS FOR THE MANUFACTURE OF GLUES, &c.

1,023,523. Specification of Letters Patent. Patented Apr. 16, 1912.

No Drawing. Application filed May 27, 1911. Serial No. 629,814.

*To all whom it may concern:*

Be it known that I, JAMES M. NEIL, of Toronto, in the county of York, Province of Ontario, Canada, have invented certain new and useful Improvements in Processes for the Manufacture of Glues, &c.; and I hereby declare that the following is a full, clear, and exact description thereof.

This invention is an improvement in the process of manufacturing glue or glue components and its object is to obtain glutin and chondrin separately in a substantially pure and dry condition; and also to recover from the waste liquors valuable by-products.

Commercial glue is principally composed of two chemical constituents glutin and chondrin. Pure dry glutin is a yellowish transparent and elastic substance possessing great cohesiveness. It is practically without smell, and insipid to the taste. Pure dry chondrin is a hard clear horny substance possessing less cohesiveness than glutin, and having an offensive smell and taste. Both glutin and chondrin will soften to jellies but are substantially insoluble in cold water while both are completely soluble in hot water. Commercial glue as produced under existing methods is a combination of glutin, chondrin and impurities, and the obtaining of a satisfactory glue product by the present known processes depends largely on climatic conditions, so that results of such processes are erratic and often beyond control of the manufacturer, as wet or dull weather adversely affects the results of such processes. My invention eliminates these uncertain conditions; and enables glue to be manufactured in accordance with definite scientific principles and with chemical accuracy, and enables me to obtain separately pure glutin and pure chondrin, and also to obtain from the waste liquors certain valuable by-products.

As is well known commercial glue is ordinarily made from bones, hides, and other suitable materials;—the following is the manner of procedure under my process in manufacturing glue from such materials:—

The bones (or other materials) are first degreased by any desired method. If bones are used I preferably grind them to a fine powder. This powder is then boiled down in water (preferably by means of steam) until the glutin, chondrin, and other soluble components are dissolved; after which the whole contents of the boiler or dissolving tank, are passed through a filter press of any suitable kind whereby the solid matters are separated and a liquor is obtained containing the glutin, chondrin, and other soluble components in solution. To this liquor I then add either a mineral or organic acid—(for example hydrochloric or acetic) in just sufficient quantity to precipitate the chondrin. The turbid liquor thus obtained is then passed preferably through a filter press whereby the precipitated chondrin is separated from the liquor in the form of a cake, and this chondrin after being washed with cold water, is dried and ground into a powder, in which form it will find a ready market for certain purposes. To the remaining liquor, (which still contains the glutin and other impurities in solution,) alcohol is then added until the liquor contains about 50% of alcohol and 50% of water, when the glutin will be precipitated. The turbid liquor thus obtained is then passed preferably through a filter press whereby the precipitated glutin is separated from the liquor in the form of a cake; and this glutin after being washed with cold water, is dried, ground and marketed in the form of powder containing approximately 100% of pure glutin.

The aforesaid glutin and chondrin powders may be mixed in order to produce a glue of any strength desired.

What I claim is:

1. The improvement in the manufacture of glue, consisting in preparing a glue liquor, treating such liquor with acid to precipitate chondrin, separating the chondrin from the liquor, then treating the liquor with alcohol to precipitate glutin, separating the glutin from the liquor; and finally mixing the glutin and the chondrin in such proportion as will produce a glue of the desired strength.

2. The herein described glue, consisting of pure powdered chondrin and pure powdered glutin mixed dry, substantially as described.

In testimony that I claim the foregoing as my own, I affix my signature in presence of two witnesses.

JAMES MILLAR NEIL.

Witnesses:
ARTHUR E. DOWELL,
JAMES R. MANSFIELD.